Patented Mar. 4, 1941

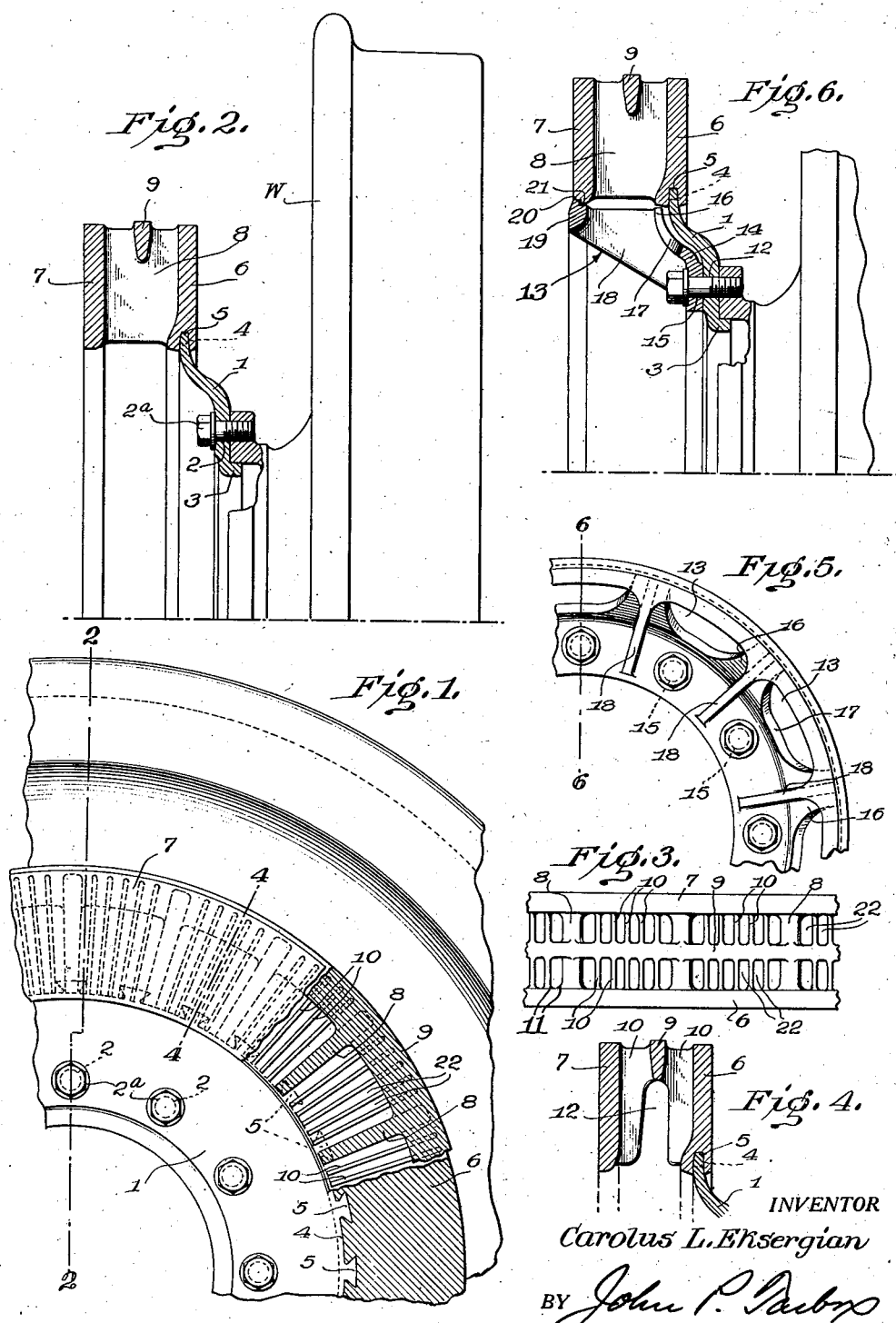

2,233,594

UNITED STATES PATENT OFFICE 2,233,594

BRAKE DISK

Carolus L. Eksergian, Detroit, Mich., assignor to Budd Wheel Company, Philadelphia, Pa., a corporation of Pennsylvania Application May 31, 1939, Serial No. 276,579

13 Claims. (Cl. 188—218)

The present invention relates to further improvements in brakes of the general type disclosed in copending application Serial Number 159,844, filed August 19, 1937 and wherein the braking effort is provided by shoes engaging the side faces of a brake ring or rings.

Specifically, the present invention relates to the structure of the brake rings, which are herein embodied as twin rings connected by cross braces and vanes, and in addition there is a third centrally arranged stiffening ring, interposed between the two brake rings.

An object of the invention is to provide a very strong and rigid brake member, which nevertheless has adequate cooling means associated therewith.

A further object is to provide an auxiliary support, fitting within the brake rings, to give additional security thereto, prevent breakage, and provide support in case unforeseen defects develop in the brake rings, such as fractures and the like.

An illustrative embodiment of the invention is disclosed in the present specification, in connection with the drawing accompanying the same.

In said drawing:

Fig. 1 is a face elevation of a brake disk assembly embodying the invention, showing it applied to a car wheel, parts being shown in section;

Fig. 2 is a cross section through a portion of the structure illustrated in Fig. 1, on the plane indicated by the line 2—2 thereof;

Fig. 3 is a developed view of a fragment of the periphery of the disk shown in Fig. 1, looking toward the axis thereof;

Fig. 4 is a section taken on line 4—4 of Fig. 1;

Fig. 5 is a face elevation of an internal supporting means for the brake rings; and Fig. 6 is a section similar to Fig. 2, through a portion of the structure shown in Fig. 5, associated with a wheel and brake ring as shown in Fig. 2, the relative positions of the rings supported by the wheel being clearly indicated.

Referring first to Figs. 1, 2, and 3 it will be noted that there is a supporting disk or web 1, having a central opening defined by the bent flange 3, to fit on the wheel W and/or axle, there being suitable holes 2 for bolts 2a to secure it thereto. At its peripheral portion 4 the disk 1, which is preferably made of wrought steel or other suitably tough and strong metal, has teeth or keys 5 formed therein, here dovetailed in shape, as best shown in Fig. 1.

The brake rings 6 and 7 are secured firmly to the disk 1 by casting them on the rim of said disk, whereby the keys 5 become embedded rigidly in the metal forming the rings.

It will be noted that the rings 6 and 7 are part of a single casting, being united by means of the braces 8 and the ring 9 interposed between them, and being also united by the cooling vanes 10.

The ring 9 is relatively thick but in radial extent is much narrower than the rings 6 and 7. The braces 8 are also relatively thick. The vanes 10 however, while they add a little to the bracing effect, have mainly the function of acting as the propeller blades of a centrifugal blower, so that when the disk is rotating a continuous flow of cooling air will pass radially outward between the rings and vanes.

Fig. 3 shows some of the air passages 22 produced by the rings, braces, and vanes, in end view, and Fig. 4 shows a face view of some of said vanes 10.

In order to secure good mechanical strength and good heat conduction, it is desirable that ample fillets should be provided wherever the vanes or braces join the various rings, such fillets being shown at 11, for instance.

As best shown in Fig. 4, the vanes 10 preferably leave an open space 12 between them, to provide a greater unobstructed space for the cooling air. It will also be clear that the braces 8 to a certain extent act as cooling vanes and conversely the cooling vanes 10 act to some degree also as strengthening braces.

While the parts are perhaps best shaped as in the drawing, it will be clear that certain deviations from the preferred shapes shown are also effective, and that the drawing discloses merely a suggestive example of the structure.

Referring now to Figs. 5 and 6, it will be seen that there is here disclosed a circular framework 13 which combines rigidity and strength with relative lightness. This framework consists essentially of a supporting web 14 having holes 15 therein, which correspond with the holes 2 in the web 1 which supports the brake rings 6 and 7, so that thus the same bolts may secure both in place.

The web 14 has a number of lugs 16 projecting from its periphery 17, and these lugs 16 will fit within the ring 6 of the brake assembly.

A number of ribs or radial braces 18 extend from the web 14 to a relatively narrow ring 19, which may have a flange 20 thereon so as to form an abutment engaging against the inner portion of the ring 7 which fits on the surface 21 of the ring 19, which may be a continuous cylindrical surface, as shown.

When the supporting device is inserted within the brake assembly, it is clear that the said assembly will be strongly reenforced thereby and in case of emergency will continue to function even if fractured, since adequate support is afforded to the brake rings by the said device.

The cooling function of the vanes 10 is not in any way disturbed by the presence of the inner support, since the braces 8 will automatically become alined with the ribs 18 when the support is secured to the brake rings 6 and 7 due to the proper location of the bolt holes, thus leaving the vanes unobstructed so that the air is free to flow therethrough.

In fact, the ribs 18 will also act as blades of a centrifugal blower, augmenting the air flow when the device rotates.

By providing a central supporting device or spider of this kind, separate from the brake rings themselves, it is possible to guard against any latent defect in one member affecting also the other, so that it will be extremely unlikely that both parts would fracture, or fail in any other way, at the same time, thus increasing the degree of safety over a device made as a single unit. It is also possible to provide the preferred material for each part, the metal of the rings 6 and 7 on the one hand being selected for the best braking action, while the metal of which the support is made is in turn selected for the best mechanical strength and toughness.

Furthermore, it is possible to employ the structure disclosed in Figs. 1, 2 and 3 independently of the support if preferred, adding such support only in certain installations wherein extreme strength is requisite.

Having thus described the invention, and a preferred embodiment thereof, in the full, clear and exact terms required by the patent laws, it will be understood that the present specification and drawing are to be taken solely in an illustrative sense, and not in any way as a limitation of the invention, which is defined solely in the following claims:

What I claim is:

1. A brake disk comprising a central web and a pair of spaced brake rings carried thereby, said rings being connected to one another at intervals by braces, and a third ring interposed between the brake rings, all the rings and braces being integral with one another.

2. A brake disk comprising a central web and a cast metal triple ring carried thereby, said triple ring comprising a centrally located stiffening ring and a brake ring spaced on each side thereof, all the rings being integrally connected by relatively thick braces extending from the central ring to each brake ring.

3. A brake disk comprising at least three rings rigidly secured to and spaced from one another by braces integral therewith.

4. A brake disk comprising a plurality of rings held in spaced parallel relation by means of relatively short and thick braces extending therebetween, said braces being spaced relatively far apart peripherally of the rings, and a relatively larger number of thin vanes located therebetween.

5. A brake disk comprising at least three parallel spaced rings connected by a number of relatively thick cross braces and also by a number of relatively thin vanes, defining a plurality of substantially radially extending air ducts, whereby both the braces and the vanes contribute jointly to the strength and cooling of the disk.

6. A brake disk comprising a pair of spaced brake rings, an intermediate ring of approximately the same external diameter as the brake rings but of less radial depth, and cross braces extending from the intermediate ring to both brake rings, and leaving a central passage substantially unobstructed, within the intermediate ring, to permit free flow of cooling air between the rings.

7. A safety supporting spider for brake rings, consisting of a relatively light and strong skeleton framework made of tough metal, shaped to fit within the brake rings but without positive securement thereto and afford radial support thereto.

8. A brake disk having a central web carrying spaced brake rings, and an independent spider fitting closely within the rings to provide support thereto.

9. A supporting spider comprising a web, said web having a plurality of lugs at its periphery, a flanged ring, and ribs extending from the web to the ring to support the said ring rigidly from said web.

10. A spider as defined in claim 9, having the ribs spaced in correspondence with the braces of the brake rings with which it is to be used, whereby the said ribs and braces will be aligned with each other in service, so as to prevent needless obstruction of the flow of cooling air.

11. A brake disc comprising three rings held in spaced parallel relation by means of relatively short and thick braces extending therebetween, the central ring being relatively narrow in radial dimension as compared with the lateral rings.

12. A brake disc comprising three rings held in spaced parallel relation by means of relatively short and thick braces, said braces being spaced relatively far apart peripherally of the rings, the central ring being disposed peripherally of the disc and being relatively narrow in radial dimension as compared with the lateral rings, and a relatively large number of thin vanes interconnecting the three rings and located between the braces.

13. A brake disc according to claim 12 in which the vanes and braces extend through substantially the full radial extent of the rings and the braces interconnect the lateral rings radially inwardly of the central ring, while the vanes in said region extend toward each other from the lateral rings but terminate short of each other, leaving a space therebetween.

CAROLUS L. EKSERGIAN.